United States Patent [19]

Adams

[11] Patent Number: 4,547,984
[45] Date of Patent: Oct. 22, 1985

[54] BRUSH UPROOTING ATTACHMENT

[76] Inventor: Robert D. Adams, R. 2, Box 144, Kalona, Iowa 52247

[21] Appl. No.: 593,913

[22] Filed: Mar. 27, 1984

[51] Int. Cl.[4] ............................................. A01B 39/12
[52] U.S. Cl. .................... 37/2 R; 37/117.5; 56/375; 172/766
[58] Field of Search ............... 172/697, 766, 777, 811, 172/684.5, 251, 252, 445.1, 445.2; 37/117.5, 2 R; 56/375, 400.17, 400.21; 171/50

[56] References Cited

U.S. PATENT DOCUMENTS

| | | | |
|---|---|---|---|
| 1,225,432 | 5/1917 | Gilbert | 56/375 |
| 1,713,152 | 5/1929 | Thamerus | 56/375 |
| 2,463,169 | 3/1949 | Grewe | 172/684.5 |
| 2,512,114 | 6/1950 | Robinson | 172/445.2 |
| 2,566,547 | 9/1951 | Bartlett | 172/777 |
| 2,840,932 | 7/1958 | Breyer | 172/777 |
| 2,986,826 | 6/1961 | Timmons | 172/438 |
| 3,658,384 | 4/1972 | Gluszek | 37/117.5 |
| 3,749,262 | 7/1973 | Stark | 172/438 |
| 4,140,348 | 2/1979 | Strada | 172/705 |

FOREIGN PATENT DOCUMENTS 222791 11/1957 Australia ............................ 172/251

*Primary Examiner*—Richard J. Johnson
*Attorney, Agent, or Firm*—Glenn H. Antrim

[57] ABSTRACT

An attachment for a front lift of a farm tractor comprises an elongated tool bar extending forward and supporting at its far end a large claw having three spaced downwardly curved, sharpened tines. The end of the tool bar nearest the lift is welded both directly and through braces to the front side of a rectangular hitch-and-tool-supporting frame, and drilled plates welded to the back side have properly spaced holes for coupling to the front lift.

1 Claim, 2 Drawing Figures

BRUSH UPROOTING ATTACHMENT

BACKGROUND OF THE INVENTION

This invention relates to brush clearing equipment and particularly to equipment to be attached to a front power lift of a tractor for pulling brush such as multiflora rose.

Undesired multiflora rose and other brush often spread quite rapidly over farm land and particularly over pastures. To clear the land for restoring it for its intended use, various implements have been proposed for attachment to the front of a tractor. Some of these proposed implements have cutting blades to be either reciprocated or rotated, their operation requiring much power from the tractor. Another has fixed transverse blades between forward extending tines on which brush can be carried.

SUMMARY OF THE INVENTION

A preferred attachment of the present invention has three tines spaced and curved like a great claw. The claw is forced down into the center of brush that is to be eradicated and is also pulled horizontally to be drawn into the ground among the roots of the brush. The brush is then uprooted as the claw continues to be drawn and gradually raised out of the ground. Regrowth of the brush is either eliminated or greatly retarded; the roots are mostly removed to prevent rapid regrowth that occurs where brush is merely cut.

The claw is fastened to the distal end of an elongated tool bar, and the proximal end of the bar is rigidly secured to a frame for connection to a front power lift of a farm tractor. The claw when in use is positioned by the tool bar at a sufficient distance in front of the tractor to facilitate forcing the claw within brush to be pulled and then is lowered to mesh with the roots of the brush. The tractor is run slowly for a short distance in a reverse direction to draw the claw among or behind the roots while the lift forces the claw downward, and then the lift is gradually raised to facilitate raising the roots from the ground as the tractor is operated in a reverse direction.

DESCRIPTION OF THE PREFERRED EMBODIMENT

Figure 1:
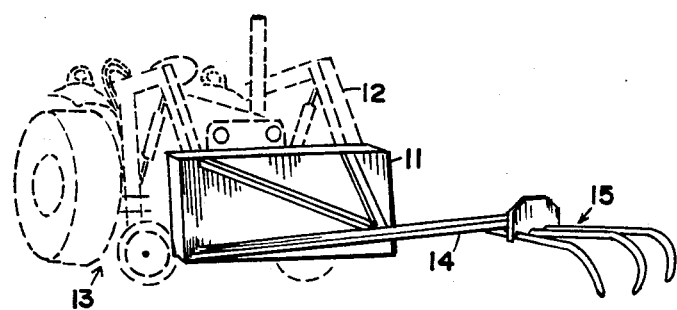
FIG. 1 is a front oblique view of a preferred embodiment of the brush clearing attachment of this invention.

In FIG. 1, a hitch-and-tool-supporting frame 11 is shown connected to a farm tractor 13 by usual front lift 12 of the type used with bulldozers. An elongated tool bar 14 extends from a center of the lower portion of the hitch-and-tool-supporting frame 11 to extend straight forward from the tractor 13 on a central longitudinal line. A tool that is herein called a claw 15 is connected to the front end of the tool bar 14 for meshing with the roots of brush to be uprooted.

Figure 2:
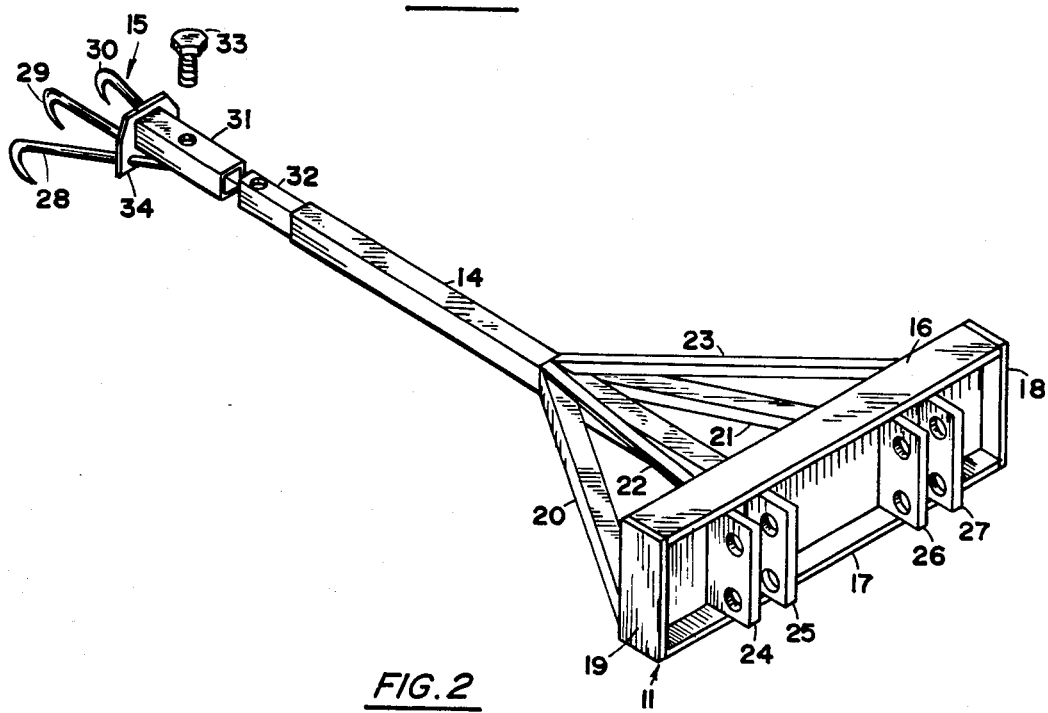
FIG. 2 is a rear oblique view of the brush clearing attachment.

With reference to FIG. 2, the hitch-and-tool-supporting frame 11 may be fabricated from a 48-inch (1.2 m) length of 4-inch (101-mm) by 14-inch (355.6-mm) I-beam. The parallel flanges of the beam function as respective top 16 and bottom 17 of the frame 11, and a plate may be welded to each end of the beam for respective sides 18 and 19. The I-beam functions as a blade for pushing uprooted bushes out of the way and into piles. Should individual plates be used for the sides of the frame 11, a vertical plate positioned within the frame 11 would be desirable. A 7-foot (2.1-m) length of 3-inch (76.2-mm) by 3-inch (76.2-mm) box steel tubing is conveniently used for the tool bar 14. A rear end of the beam for the tool bar 14 is welded inside the central portion of the lower flange of the hitch-and-tool-supporting frame 11 perpendicular to the frame. When the hitch-and-tool-supporting frame 11 is hitched to the front lift 12, the tool bar extends forward. Braces for holding the tool bar 14 firmly to the frame 11 include lower pieces of a rectangular tubing 20 and 21, each having an end welded to the tool bar 14 at a point spaced from the frame 11 and the other end welded to a respective lower corner of the frame 11, and upper pieces of rectangular tubing 22 and 23, each having an end welded to the tool bar 14 and the other end welded to the upper part of the frame 11 at points spaced from respective upper corners of the frame 11.

Four separate, rectangular plates are supplied for making the two pairs of connecting plates 24–25 and 26–27 for a particular lift 12 of the user's tractor 13. A user drills a pair of holes in each plate, as required for coupling pins, and welds the plates vertically between the upper and lower flanges of the hitch-and-tool-supporting frame 11 at spacings required for the particular lift 12.

Preferably, the claw 15 has three tines 28–30 spaced apart horizontally and diverging slightly. A proximal end of each of the tines 28–30 is either welded directly to the lower surface of the tool bar 14 at a point spaced a short distance from the front end of the tool bar or is preferably welded to a separate piece of rectangular steel tubing 31 functioning as a socket of a coupling to be slid over a smaller piece of tubing 32 welded to the front end of the main portion of the tool bar 14. Mating holes are drilled through the coupling portions 31 and 32 for receiving a connecting bolt 33 in a usual manner. Each of the tines 28–30 extend through a respective opening in a plate 34 welded across the front end of the tool bar 14 or the end of the socket 31 when it is used. The middle tine 29 of the claw 15 extends longitudinally with respect to the tool bar 14, and the outer tines 28 and 30 spread out at moderate angles with respect to the center tine 29 for making a claw suitable for meshing with roots of brush. Each of the tines 28–30 extend from the plate 34 forward about 16 inches (406 mm) to the front surface of a downwardly curved portion. The least inside radius of each of the tines is about 3 inches (76.2 mm), and the tines are curved to such an extent that sharpened lower portions extend slightly rearward and downward. Suitable material for the tines is 1-inch (25.4 mm) round hot-rolled carbon spring steel.

I claim:

1. A brush uprooting attachment comprising:
   an elongated tool bar having a claw-like tool secured to one end thereof and mounting frame means secured to the other end thereof,
   said claw-like tool comprising a plurality of slender strong tines extending beyond said one end of said elongated tool bar,
   each of said tines having a secured end secured to said one end of said elongated tool bar, a straight portion extending outward from said secured end beyond said one end of said elongated tool bar and a curved portion continuing outward, downward, and then inward to terminate in pointed ends, said straight portions diverging in an outward direction from said one end of said elongated tool bar and said curved portions having a rate of curvature to facilitate enmeshing said pointed ends about roots of brush to be uprooted, said pointed ends being directed substantially toward said mounting frame means, said mounting frame means adapted to be coupled to a power lift of a tractor for extending said elongated tool bar longitudinally therefrom, and said power lift to be operated to lower and to raise said claw-like tool during back and forth movement of said tractor to enmesh said pointed ends among roots of brush and to remove said brush.

* * * * *